(12) United States Patent
Morgenstern et al.

(10) Patent No.: US 10,877,144 B2
(45) Date of Patent: Dec. 29, 2020

(54) DEVICE FOR DETERMINING THE TOPOGRAPHY OF THE BURDEN SURFACE IN A SHAFT FURNACE

(71) Applicant: TMT TAPPING MEASURING TECHNOLOGY SÁRL, rue d'Alsace (LU)

(72) Inventors: Hans-Uwe Morgenstern, Freudenberg (DE); Ulrich Oster, Wilnsdorf (DE); Kevin Viktor, Bürden (LU); Jean-Francois Stumper, Filsdorf (LU)

(73) Assignee: TMT TAPPING-MEASURING-TECHNOLOGY SARL, Luxembourg (LU)

(*) Notice: Subject to any disclaimer, the term of this patent is extended or adjusted under 35 U.S.C. 154(b) by 561 days.

(21) Appl. No.: 15/112,314

(22) PCT Filed: Jan. 19, 2015

(86) PCT No.: PCT/EP2015/050893
§ 371 (c)(1),
(2) Date: Jul. 18, 2016

(87) PCT Pub. No.: WO2015/107195
PCT Pub. Date: Jul. 23, 2015

(65) Prior Publication Data
US 2016/0341825 A1 Nov. 24, 2016

(30) Foreign Application Priority Data

Jan. 20, 2014 (DE) .................. 10 2014 200 928

(51) Int. Cl.
*G01S 13/89* (2006.01)
*F27B 1/28* (2006.01)
(Continued)

(52) U.S. Cl.
CPC .............. *G01S 13/89* (2013.01); *C21B 5/008* (2013.01); *C21B 11/02* (2013.01); *F27B 1/28* (2013.01);
(Continued)

(58) Field of Classification Search
CPC . C21B 11/02; C21B 5/008; C21C 2005/5288; F27B 1/28; F27D 21/00;
(Continued)

(56) References Cited

U.S. PATENT DOCUMENTS 4,110,617 A * 8/1978 Legille ............... G01C 7/00
250/342
4,341,120 A 7/1982 Anderson
(Continued)

FOREIGN PATENT DOCUMENTS

DE  40 27 975 A1  3/1991
DE  4238704 A1  5/1994
(Continued)

OTHER PUBLICATIONS

Chinese Patent Office, Office Action and Search Report, Application No. 201580005051.6, dated Feb. 1, 2018, 6 pages.
(Continued)

*Primary Examiner* — Keith D. Hendricks
*Assistant Examiner* — Michael Aboagye
(74) *Attorney, Agent, or Firm* — Quarles & Brady LLP

(57) ABSTRACT

A device for determining the topography of the burden surface in a shaft furnace (10), the device comprising a radar device (20) that scans the burden surface (18) and has an antenna device (22) arranged in the area of a furnace cover (13), the antenna device being arranged on an axis of rotation (24) that is inclined in relation to a vertical axis (15) of the shaft furnace at an angle of inclination α and being rotatable about the axis of rotation by means of a drive (Continued)

device in such a manner that a radar fan beam (28) formed by the emitted radar radiation of the antenna device is incident upon the burden surface along a profile line p and sweeps across the burden surface as the antenna device rotates.

7 Claims, 2 Drawing Sheets

(51) Int. Cl.
*G01S 5/02* (2010.01)
*F27D 21/00* (2006.01)
*C21B 5/00* (2006.01)
*F27D 21/02* (2006.01)
*C21B 11/02* (2006.01)
*C21C 5/52* (2006.01)

(52) U.S. Cl.
CPC ......... *F27D 21/00* (2013.01); *F27D 21/0028* (2013.01); *F27D 21/02* (2013.01); *G01S 5/0205* (2013.01); *C21C 2005/5288* (2013.01); *Y02P 10/134* (2015.11); *Y02P 10/20* (2015.11)

(58) Field of Classification Search
CPC ...... F27D 21/0028; F27D 21/02; G01S 13/89; G01S 5/0205
USPC ............ 266/44, 92, 99, 78; 75/10.38, 10.41; 314/124; 73/290 R
See application file for complete search history.

(56) References Cited

U.S. PATENT DOCUMENTS

| | | | |
|---|---|---|---|
| 5,043,735 A * | 8/1991 | Mawhinney | C21B 7/24 266/92 |
| 6,020,844 A | 2/2000 | Bai et al. | |
| 8,568,652 B2 * | 10/2013 | Lu | C21B 5/006 266/100 |
| 9,417,321 B2 * | 8/2016 | Sadri | F27B 3/085 |
| 2004/0108951 A1 | 6/2004 | Edvardsson | |

FOREIGN PATENT DOCUMENTS

| | | |
|---|---|---|
| EP | 0291757 A1 | 11/1988 |
| EP | 2 202 536 A2 | 6/2010 |
| EP | 2 363 694 A1 | 9/2011 |
| EP | 2439561 A1 | 4/2012 |
| JP | S5110466 B1 | 4/1976 |
| JP | S5675146 A | 6/1981 |
| JP | H03144392 A | 6/1991 |
| JP | H06011328 A | 1/1994 |
| JP | 2010174371 A | 8/2010 |
| WO | 2010144936 A1 | 12/2010 |

OTHER PUBLICATIONS

PCT English Language Translation of the International Preliminary Report on Patentability, PCT/EP2015/050893, dated Aug. 4, 2016, 7 pages.

The International Search Report dated Jun. 1, 2015 for International Application No. PCT/EP2015/0508093.

Japan Patent Office, Office Action, Application No. 2016-546463, dated Jul. 24, 2018, 4 pages.

* cited by examiner

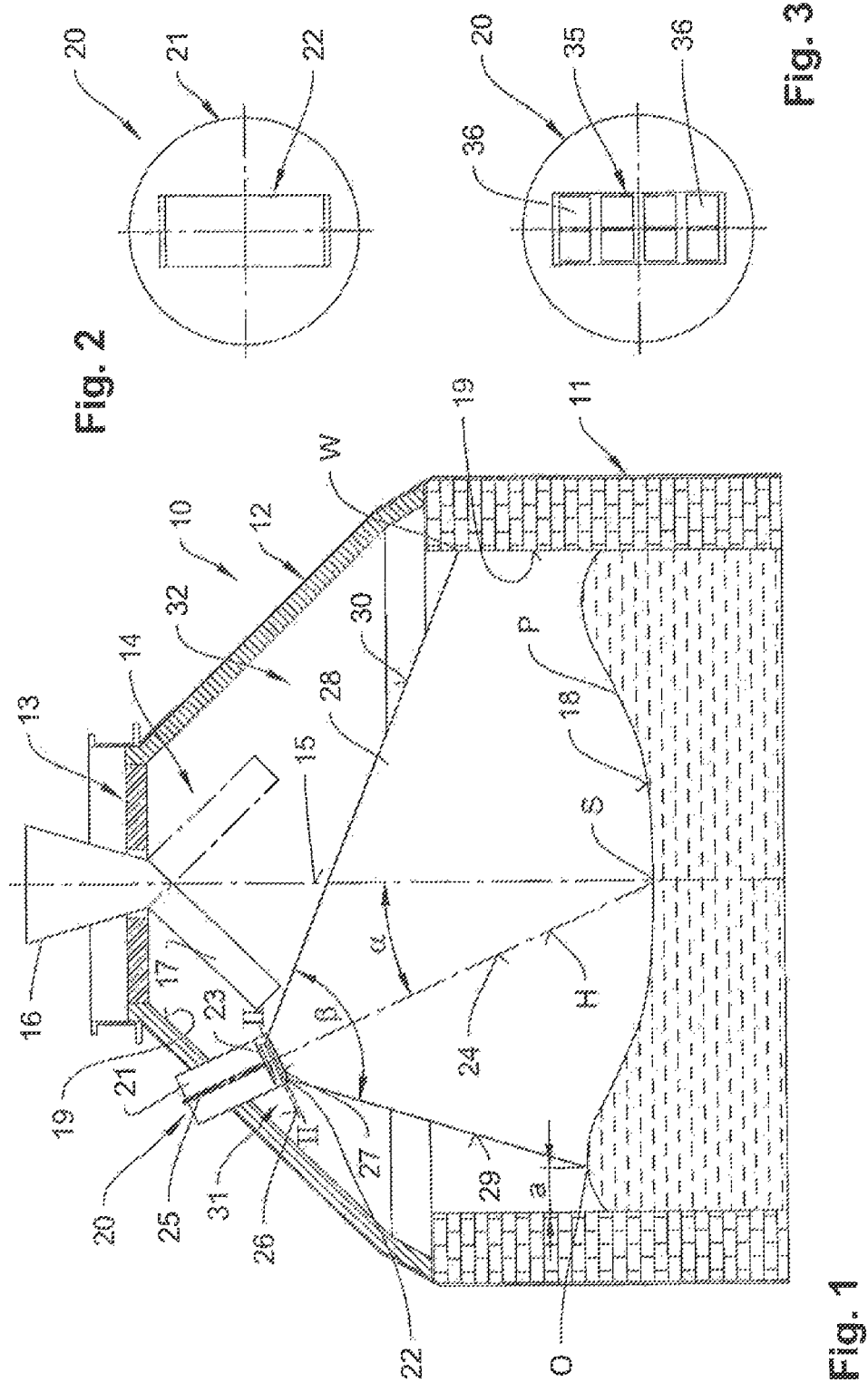

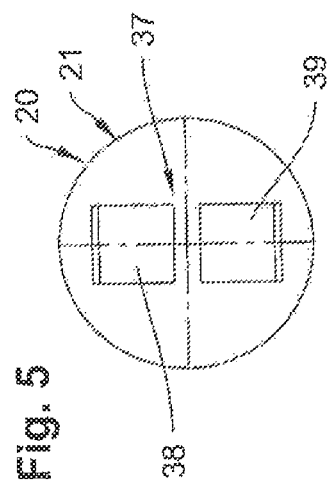
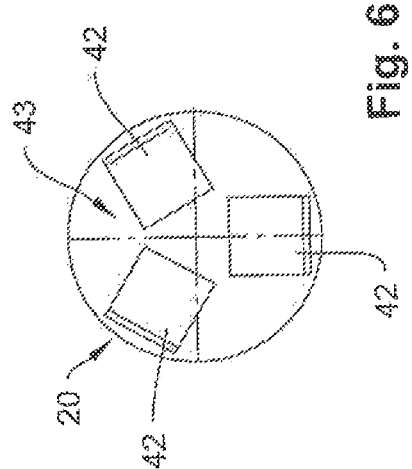
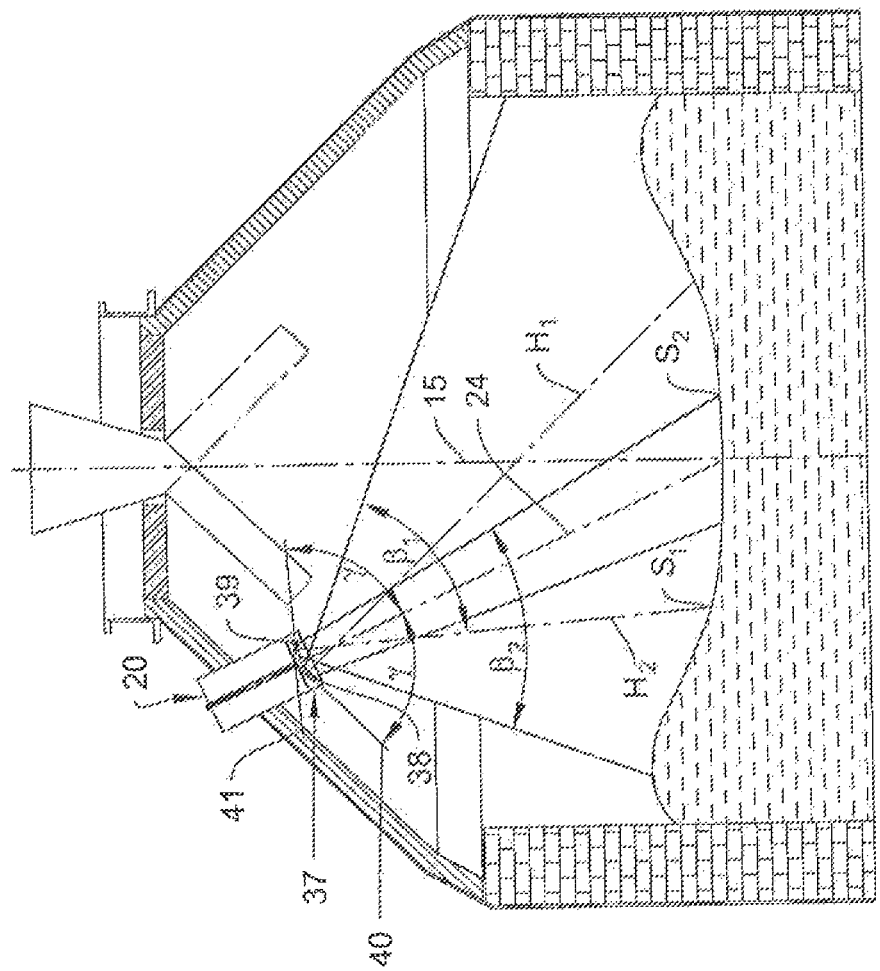

DEVICE FOR DETERMINING THE TOPOGRAPHY OF THE BURDEN SURFACE IN A SHAFT FURNACE

CROSS-REFERENCE TO RELATED APPLICATIONS

This application represents the national stage entry of PCT International Application No. PCT/EP2015/050893 filed Jan. 19, 2015 and claims priority to German Patent Application No. 10 2014 200 928.6 filed Jan. 20, 2014. The contents of this application are hereby incorporated by reference as if set forth in their entirety herein.

The invention relates to a device for determining the topography of the burden surface in a shaft furnace, the device comprising a radar device that scans the burden surface and has an antenna device arranged in the area of a furnace cover.

The process taking place in a shaft furnace is substantially determined by the structure of the layering of coke and burden layers arranged in the furnace vessel. To form the layers, the furnace is charged with coke and burden through a charge opening, which is arranged in the furnace cover and in which a charging device is arranged, which is rotatable about the vertical axis of the shaft furnace and the technical term for which is rotating chute (Drehschurre in German) and which has a filling chute, whose inclination in relation to the vertical axis is adjustable. The rotating chute allows the shaft furnace to be alternately fed with coke and burden layers, the aim being to form layers that are defined as exactly as possible so as to achieve a reproducible furnace process.

To this end, it is necessary to determine the surface topography of the topmost layer as exactly as possible prior to placement of the subsequent layer. In this context, the use of radar devices is known, by means of which the surface topography can be mapped.

From EP 0 291 751 A, a radar device is known that is arranged at the end of a tube lance penetrating the vessel wall of the furnace below the furnace cover and that allows a surface profile of the burden to be mapped by the radar device being moved radially up to the center axis of the shaft furnace by means of the tube lance. To map other radial surface profiles of the burden, EP 0 291 751 A1 proposes arranging the radar device at the end of the tube lance in such a manner that it is additionally pivotable about a longitudinal axis and a transverse axis of the tube lance, allowing the burden surface to be scanned on rectangular "cross-hairs".

Aside from the fact that the known radar device allows mapping of substantially linear radial surface profiles only and does not allow mapping of the topography of the entire burden surface, realizing the known radar device requires a significant amount of equipment, which requires both the provision of a displaceable tube lance penetrating the vessel wall of the shaft furnace and a bi-axially pivotable arrangement of the radar device at the end of the tube lance.

To avoid such an amount of equipment required, it is known from WO 2010/144936 A1 for a radar device to be fixedly arranged in a furnace cover, the radar device being provided with an antenna device that is arranged in a plane vertical to the vertical axis of the shaft furnace and that is composed of a plurality of patch antennas arranged in a matrix arrangement. These patch antennas emit radar radiation onto the entire burden surface, making a scanning process as the one known from EP 0 201 751 A1 unnecessary, which requires axial movement of the antenna device at a high amount of equipment needed. To ensure that the radar radiation reaches all areas of the burden surface, the antenna device known from WO 2010/144936 A1 is arranged in the furnace cover on the vertical axis of the shaft furnace. To achieve a high angular resolution and to reduce interference of the radar radiation emitted by the plurality of patch antennas, a synthetic aperture is formed via complex control of the patch antennas in such a manner that defined patch antennas are operated as transmitting antennas and other defined patch antennas are operated as receiving antennas.

Aside from the fact that the known radar device requires extensive control effort in order to produce the synthetic aperture necessary for operation of the radar device, the arrangement of the radar device in the furnace cover is accompanied by significant disadvantages. On the one hand, a maximum possible temperature load arises for the radar device and in particular for the temperature-sensitive antenna device. On the other hand, installation of the radar device in a conventionally configured shaft furnace, which has the above-described rotating chute for defined charging of the burden surface in the furnace cover, is impossible because mutual interference would be unavoidable.

Hence, the object of the present invention is to propose a device of the kind mentioned above that allows precise mapping of the topography of the burden surface and whose installation and operation is possible with minimal effort.

According to the invention, the antenna device is arranged on an axis of rotation inclined in relation to a vertical axis of the shaft furnace at an angle of inclination $\alpha$ and is rotatable about the axis of rotation by means of a drive device in such a manner that a radar fan beam formed by the emitted radar radiation of the antenna device is incident upon the burden surface along a profile line p and sweeps across the burden surface as the antenna device rotates.

Owing to its arrangement on the axis of rotation inclined in relation to the vertical axis of the shaft furnace, the device according to the invention thus allows an arrangement that does not collide with a charging device arranged in the furnace cover and preferably realized as a rotating chute. On the other hand, the arrangement of the antenna device on the axis of rotation inclined in relation to the vertical axis leads to a generally reduced temperature load for the antenna device as compared to an arrangement on the vertical axis. Furthermore, the superimposition according to the invention of a rotating movement of the antenna device on a radar fan beam emitted by the antenna device makes it possible that the antenna device does not necessarily have to be operated with a control for forming a synthetic aperture in order to achieve the desired high resolution of the surface. Instead, the achievable resolution depends on, among other things, the pulse rate of the radar radiation and the speed of rotation at which the antenna device rotates about the axis of rotation.

Overall, the device according to the invention thus allows the burden surface to be mapped with high resolution while requiring comparatively little control effort and little equipment because it is merely necessary to form an axis of rotation for the rotation of the antenna device.

In this way, it is also possible to retrofit a conventionally configured shaft furnace, which has a charging device preferably realized as a rotating chute in its furnace cover, by integrating the device according to the invention.

In a preferred embodiment, the angle of inclination $\alpha$ of the axis of rotation in relation to the vertical axis is between 20° and 60°.

A particularly simple design of the device becomes possible if the antenna device is arranged in an antenna plane oriented vertically to the axis of rotation.

If mapping of the entire bulk-material or burden surface by means of only one antenna proves insufficient in particular because of insufficient quality or an undersized opening angle of the antenna device used, a modular design of the antenna device composed of at least two antenna modules is possible, as well, a superimposition of the beam opening angle of the antenna modules allowing the formation of a radar fan beam having the desired width.

The use of a plurality of antenna modules for the antenna device also allows reducing the angle of rotation necessary for mapping the entire surface.

The antenna modules can be arranged in a shared antenna plane or in different antenna planes inclined at an angle toward one another.

In particular, the different antenna planes, in which the antenna modules are arranged and which are inclined at an angle toward another, can be arranged at different angles to the axis of rotation.

Hereinafter, preferred embodiments of the device will be explained in more detail with the aid of the drawing. In the drawing:

FIG. 1 shows a sectional illustration of a shaft furnace having a first embodiment of a radar device arranged in a vessel wall in an upper portion of a furnace vessel;

FIG. 2 shows the radar device illustrated in FIG. 1 in a sectional illustration according to section line II-II in FIG. 1;

FIG. 3 shows an alternative embodiment of the radar device illustrated in FIG. 2;

FIG. 4 shows another embodiment of a radar device arranged in a vessel wall;

FIG. 5 shows a sectional illustration of the radar device illustrated in FIG. 4 according to section line V-V; and FIG. 6 shows an alternative embodiment of the radar device illustrated in FIG. 5.

FIG. 1 shows a shaft furnace 10 that substantially consists of a furnace bottom 11, a furnace top 12 and a furnace cover 13 into which a charging device is integrated, said charging device being realized as a rotating chute 14 in this case and being pivotable about a vertical axis 15 so that a filling chute 17 adjacent to a funnel opening 16 of the rotating chute 14 and adjustable in its inclination relative to the vertical axis 15 can be positioned in a defined manner.

The rotating chute 14 serves to alternately charge the shaft furnace 10 with coke and burden layers, which are not illustrated separately in FIG. 1, the aim being to form layers defined as exactly as possible so as to achieve a reproducible furnace process. To this end, it is necessary to determine the surface topography of the topmost layer as exactly as possible prior to placement of the subsequent layer.

To map a burden surface 18 illustrated in FIG. 1, a radar device 20 is arranged in the area of the furnace cover 13 above the burden surface 18 in a furnace wall 19 of the furnace top 12, a housing 21 of the radar device 20 penetrating the furnace wall 19. Within the housing 21, there is an antenna device 22 that is arranged on an antenna support 23 rotatable about an axis of rotation 24 and drivable by means of a drive device (not illustrated) via a support shaft 25.

The antenna device 22, which is also illustrated in FIG. 2, is located in an antenna plane 26 arranged vertically to the axis of rotation 24 in this case and is shielded against the furnace atmosphere by a protective screen 27 permeable to radar radiation. In the illustrated embodiment, the axis of rotation 24 is inclined in relation to the vertical axis 15 at an angle of inclination α of about 30 degrees and intersects the vertical axis 15 in about a point of intersection S of the vertical axis 15 and the burden surface 18. The antenna device 22 is realized in such a manner that a main axis direction H of the radar radiation substantially coincides with the axis of rotation 24 and a beam opening angle β of the antenna device 22 is sufficiently large to form a radar fan beam 28 that is capable of being incident upon the burden surface 18 along a profile line p between the vertical axis 15 and the furnace wall 19 of the shaft furnace 10. In the case at hand, the radar fan beam 28 is formed with edge beams 29, 30, edge beam 29 intersecting the burden surface 18 in a surface point O at a distance a from the furnace wall 19 in an installation half 31 of the shaft furnace 10 in which the radar device 20 is located, and edge beam 30 intersecting the furnace wall 19 in a wall point W on a furnace half 32 opposite the installation half 31, profile line p of the burden surface 18, upon which the radar fan beam 28 is incident, thus extending from surface point O to furnace wall 19 in the illustrated embodiment. The radar fan beam 28 sweeps across the entire burden surface 18 as the antenna device 22 rotates by 360° about the axis of rotation 24.

FIG. 3 shows an antenna device 35 that consists of multiple antenna modules 36 arranged in the same antenna plane 26.

FIG. 4 shows the radar device 20 comprising an antenna device 37 that has two antenna modules 38, 39, each of which is arranged in an antenna plane 40, 41. The antenna planes 40, 41 are each inclined to the axis of rotation at an angle γ, the main axis directions H1, H2 of the antenna modules 38, 39 thus intersecting the burden surface 18 in different points of intersection S1 and S2. Both antenna modules 38, 39 have an opening angle β1 and β2, respectively, which match in the case at hand. When superimposed, both opening angles β1, β2 of the antenna modules 38, 39 form a radar fan beam 28, which matches the radar fan beam 28 illustrated in FIG. 1.

Notwithstanding the illustration in FIG. 4, it is also possible, of course, that the antenna planes 40 of the antenna modules 38, 39 have different angles γ in relation to the axis of rotation 24. As illustrated in FIG. 6, it is also possible that three or more antenna modules 42, 43, 44 together form an antenna device 45, wherein the antenna planes in which the antenna modules 42 to 44 are located can have a matching angle in relation to the axis of rotation 24 or different angles in relation to the axis of rotation 24.

Independently from the antenna devices 22, 35, 37, 45 of the radar device 20 as illustrated with the aid of FIGS. 1 to 6, it becomes clear that the radar device designed according to the invention allows for arrangement or integration into a shaft furnace 10 without risk of collision with a charging device arranged in the furnace cover 13 and realized as a rotating chute 14 in the case at hand.

The invention claimed is:

1. A device for determining a topography of a burden surface in a shaft furnace, the device comprising: a radar device scanning a burden surface of a shaft furnace; an antenna forming part of the radar device and emitting radar radiation, the antenna being arranged proximal a furnace cover and on an axis of rotation inclined in relation to a vertical axis of the shaft furnace at an angle of inclination between 20° and 60° in relation to the vertical axis; and a drive rotatably driving the antenna 360° about the axis of rotation in such a manner that a radar fan beam formed by the emitted radar radiation of the antenna is incident upon the burden surface along a profile line p and sweeps across the entire burden surface as the antenna rotates.

2. The device according to claim 1, in which the antenna device is arranged in an antenna plane oriented vertically to the axis of rotation.

3. The device according to claim 1, in which the antenna has at least two antenna modules.

4. The device according to claim 3, in which the antenna modules are arranged in a shared antenna plane.

5. The device according to claim 3, in which the antenna modules are arranged in different antenna planes inclined at an angle γ to the axis of rotation.

6. The device according to claim 5, in which the antenna planes are arranged at different angles to the axis of rotation.

7. The device according to claim 1, in which the radar device is a single radar device.

* * * * *